UNITED STATES PATENT OFFICE.

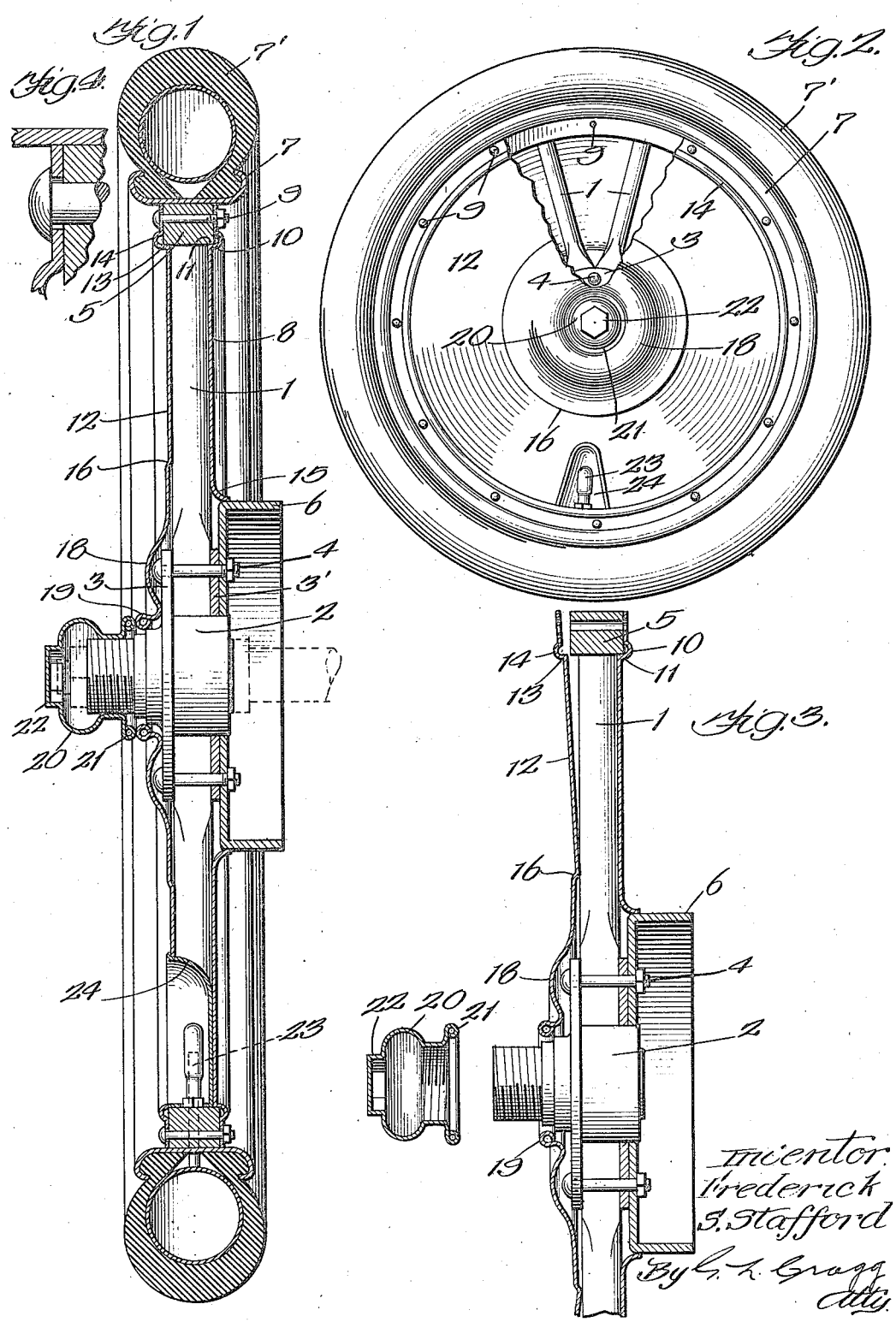

FREDERICK S. STAFFORD, OF CHICAGO, ILLINOIS, ASSIGNOR TO HENRY G. SAAL, OF CHICAGO, ILLINOIS.

WHEEL.

1,423,694.   Specification of Letters Patent.   Patented July 25, 1922.

Application filed December 5, 1919. Serial No. 342,642.

*To all whom it may concern:*

Be it known that I, FREDERICK S. STAFFORD, a citizen of the United States, residing at Chicago, in the county of Cook and State of Illinois, have invented a certain new and useful Improvement in Wheels, of which the following is a full, clear, concise, and exact description.

My invention relates to wheels, certain features thereof being of particular service in the formation of vehicles wheels employed in the manufacture and reconstruction of motor vehicles though the invention is not to be limited in its use. Other features of the invention relate to the demountable attachment of pneumatic tires to vehicle wheels.

In carrying out certain characteristics of my invention I employ a metal disc formed with a peripheral shoulder upon its inner face, this shoulder being surrounded and engaged by the wheel rim or the felly portion of such rim if the wheel happens to carry a pneumatic or other tire. This shoulder is preferably formed by providing the disc with an outwardly bulging circular bead extending further inward upon its inner circle to form the shoulder and being surrounded by and joining with a circumscribing ring portion of the disc which is secured to the wheel felly by bolts. In the form of the invention herein disclosed, the disc is provided with a circular opening at its central portion, this opening being sufficiently large to receive a hub portion of the wheel with which the disc is in engagement.

A wheel embodying the preferred form of my invention employs spokes, preferably of wood, which radiate from a hub at their inner ends and are attached at their outer ends to a wheel rim or felly, and two discs between which the spokes are disposed. Before the application of at least one disc to the wheel it is sufficiently dished to be engageable with the wheel spokes along a circular line well within the rim or felly of the wheel and to flare away from the wheel from the places of contact of the disc with the wheel spokes. As one purpose served by the discs is to improve the appearance of the wheel supplied therewith, one of the discs is applied to the outer face of the wheel. This particular disc overlies the hub flange and the bolts that clamp the hub flange to the wheel, there being desirably an outwardly bulging annular swell or large bead upon this disc that receives the heads of said bolts. The edge of the central hub receiving opening of this disc engages the hub and acts as a centering means for the disc. There is desirably employed a cap upon the outer end of the hub and in threaded engagement therewith, this cap serving to clamp the central portion of the outer disc against the wheel. In the clamping operation the resiliency of the dished disc is overcome and both discs are brought in close engagement with the wheel spokes and to engage the shoulders at the peripheries of the discs with the felly of the wheel. A wheel thus constructed is free of noisy vibration of the discs and is well adapted to previously constructed wooden wheels which are thereby strengthened or restored in strength to make them of further service if about worn out and improving them in appearance.

The invention will be more fully explained by reference to the accompanying drawings illustrating the preferred embodiment thereof as applied to a driving vehicle wheel of an automobile, but to which embodiment the invention is not to be limited. In the drawings Fig. 1 is a diametrical sectional view of a wheel embracing the invention; Fig. 2 is an outer face view of the wheel shown in Fig. 1 with parts broken away; Fig. 3 is a sectional view showing the wheel in partial construction; and Fig. 4 is an enlargement of a detail of construction as it appears in Fig. 1.

Like parts are indicated by similar characters of reference throughout the different figures.

I have illustrated a common form of wooden spoked driving automobile vehicle wheel to which my invention is applied. The wheel shown includes wooden spokes 1 having widened bases that bring adjacent ones of them in contact with each other where they immediately surround the hub 2 that is formed preferably of metal. The hub has a circular flange 3 between which and a circular clamping plate 3' the bases of the spokes are clamped by means of bolts 4. The automobile wheel illustrated is a propelling wheel, and is, therefore, equipped with a brake drum 6 clamped to the hub portions of the wheel spokes by the aforesaid bolts 4. The spokes are joined, at their outer ends, with a felly 5 constituting a tire supporting wheel rim. A tire retaining rim 7 surrounds and is secured to the felly when the wheel is pneumatic. A pneumatic tire 7' is held by said tire retaining rim.

A metal disc 8 is disposed upon the inner face of the wheel, this disc being secured in place by means of bolts 9 that pass through the rim portion 5 and clamp the peripheral portion of said disc against the inner face of said rim portion. The wheel rim portion 5 has its inner circular face supported and seated upon or in snug engagement with an annular shoulder 10 which is preferably formed upon the disc 8 by producing thereon an outwardly bulging bead 11 which is concentric with the periphery of the wheel and said disc. The inner circular side of said bead is wider than its outer circular side so that the circumscribing ring like or peripheral portion of the disc that is clamped to the ring portion 5 will be in a plane that is outwardly beyond the general plane of the disc portion supporting shoulder 10 so that the formation of a shoulder adapted to the support of the rim portion 5 illustrated is assured. The invention, however, is not to be limited to this construction for producing the shoulder which would not be required with all shapes of the rim portion 5.

Another metal disc 12 is disposed upon the wheel, this second disc being upon the outer face of the wheel, the same bolts 9 that clamp disc 8 to the periphery of the wheel rim portion 5 also performing this function upon disc 12, these bolts clamping the peripheral portion of disc 12 against the outer face of said rim portion. The wheel rim portion 5 has its inner circular face also supported and seated upon or in snug engagement with a shoulder 13 which is preferably formed upon the disc 12 by producing thereon an outwardly bulging bead 14 which is concentric with the periphery of the wheel and said discs. The inner circular side of said bead 14 is wider than its outer circular side so that the circumscribing ring-like or peripheral portion of the disc 12 that is clamped to the rim portion 5 will, as in the case of disc 8, be in a plane that is outwardly beyond the general plane of the disc portion supporting the shoulder 13 so that the formation of a shoulder adapted to the support of the rim portion 5 illustrated is assured. As hitherto stated, the invention is not to be limited to this construction for producing the shoulder.

The holes in the discs 8 and 12 that receive the bolts 9 are elongated or enlarged radially of the wheel, preferably upon opposite sides of the bolts, to permit of slight movements of the discs in the plane of and with reference to the wheel. This construction avoids such rigid interrelation between the discs and the wheel structure or wheel elements interposed therebetween as would prevent slight yielding of the rim portion of the wheel with respect to the hub portion. This construction also permits the disc to yield resiliently between their peripheral portions and their central portions, particularly if the latter portions are so secured to or so engage the hub portions of the wheel as to be substantially immovable with respect thereto.

The wheel illustrated is an automobile propelling vehicle wheel having the aforesaid brake drum constituting an inner hub portion. The inner disc 8 is formed with a flange or shoulder 15 preferably curled, that is in snug engagement with the cylindrical portion of the brake drum 6, this flange also forming a centering device for the disc 8 in the assembly thereof with the wheel.

The discs 8 and 12 is formed preferably of spring steel about one sixteenth of an inch in thickness. Before the application of the disc 12 to the wheel it is preferably generally concave or of dish form, as illustrated by dotted lines, being constrained to its flatter form by means of the bolts 9. This rim of the bottom of the initially dished disc is formed by means of a shoulder forming bead 16 which is concentric with the wheel and its discs, this shoulder extending inwardly beyond the portion of the disc it circumscribes to constitute the shoulder a fulcruming edge, engaging the wheel spokes 1, upon which such disc is brought from its outwardly flaring form illustrated by dotted lines to its flatter form by the action of the clamping bolts 9, this circumscribed or central disc portion being clamped to the wheel by the aforesaid bolts 4 passing through and between the bases of the spokes, these being the bolts that clamp the bases of the spokes 1 between the hub flange 3 and the clamping plate 3'. By this construction the disc 12 is pressed against the wheel spokes in a manner to prevent rattling and to reinforce and strengthen the wooden portion of the wheel, the discs of my invention being applicable to worn wooden wheels as well as being of service in the formation of new wheels.

The front disc 12 desirably overlies or is in front of the hub flange 3. A large outwardly bulging annular swell 18, concentric with the wheel and its discs, is formed in this disc and is in front of and covers the heads of the annular row of bolts 4 that clamp the wheel spokes between the hub flange 3 and plate 3', this swell contributing to the ornate appearance of disc 12 and imparting a small degree of flexibility to the disc that readily permits the disc to be changed from its dish formation to its flatter formation when it is clamped in place at its central and peripheral portions. This swelling formation 18 also adds a spring or resilient quality to the disc 12 which urges the annular shoulder 16 against the spokes 1 of the wheel and maintains this shoulder and these spokes in engagement during and after the flattening of the disc resulting from the clamping action of the bolts 9. This disc 12, in the embodiment of the invention illustrated, has a central circular opening that receives the hub flange 2. This central opening is bordered by an outwardly projecting annular bead 19 in snug engagement with the hub. The edge or shoulder 19 also forms a centering device in the assembly of disc 12 with the wheel. As one means for clamping the central portion of the disc 12 against the hub portion 3 I use a cap 20 in threaded engagement with the hub and expanded upon its inner end at 21 to have clamping engagement with the shoulder 19. This cap has its outer end 22 polygonal in contour for the application of a wrench thereto. The cap not only performs the mechanical function ascribed to it, but also is preferably shaped to be decorative.

The outer disc 12 is provided with a recessed formation at which there is accessibly disposed the usual nipple 23 employed for the connection with a source of air under pressure and having connection with the inner tube of the tire whereby the tire may be inflated or replenished with air under pressure. A pocket formation 24, opening outwardly, is preferably provided to receive said nipple. The pocket formation may be a separate piece of shaped sheet metal interlocked at its forward edge with the portion of the disc (12) margining the recess formed therein. The nipple and the pocketed formation receiving it are between adjacent wheel spokes (where spokes are employed) being just as accessible for manipulation as though the discs were absent.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A wheel having a tire, spokes, and a hub which has a flange and a circular clamping plate between which hub elements the inner ends of the wheel spokes are disposed, and bolts that clamp said hub elements against the spokes; in combination with a disc substantially covering a face portion of the wheel that is surrounded by the tire and formed with an outwardly bulging annular swell near the wheel hub that surrounds an annular disc portion and covers ends of the aforesaid bolts.

2. A wheel having a tire, spokes, and a hub which has a flange and a circular clamping plate between which hub elements the inner ends of the wheel spokes are disposed, and bolts that clamp said hub elements against the spokes; in combination with a disc substantially covering a face portion of the wheel that is surrounded by the tire and formed with an outwardly bulging annular swell near the wheel hub that surrounds an annular disc portion and covers ends of the aforesaid bolts; and means for clamping the portion of the disc surrounded by said swell against one of the aforesaid hub elements.

3. A wheel having a tire, spokes, and a hub which has a flange and a circular clamping plate between which hub elements the inner ends of the wheel spokes are disposed, and bolts that clamp said hub elements against the spokes; in combination with a disc substantially covering a face portion of the wheel that is surrounded by the tire and also covering ends of the aforesaid bolts, said disc having an opening through which the hub passes; and a cap in threaded engagement with the hub and in separable engagement with the disc and serving to clamp it against one of the aforesaid hub elements.

4. A wheel having a tire, in combination with a disc substantially covering a face portion of the wheel that is surrounded by the tire and having an opening through which the wheel hub passes; and a cap in threaded engagement with the hub to clamp the disc against the wheel.

5. A wheel having a tire, in combination with a disc substantially covering a face portion of the wheel that is surrounded by the tire and having an opening through which the wheel hub passes; and a cap upon the hub in separable engagement with the disc and serving to clamp it against the wheel.

In witness whereof, I hereunto subscribe my name this eighteenth day of November, A. D., 1919.

FREDERICK S. STAFFORD.